(12) United States Patent
Ashcraft et al.

(10) Patent No.: US 8,797,727 B2
(45) Date of Patent: Aug. 5, 2014

(54) LAPTOPS AND METHODS OF PROTECTING ELECTRONIC COMPONENTS OF A LAPTOP

(75) Inventors: Britt C. Ashcraft, Tomball, TX (US); Eric Chen, Houston, TX (US); Sana Syecia Ali, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 13/233,799

(22) Filed: Sep. 15, 2011

(65) Prior Publication Data

US 2013/0070404 A1 Mar. 21, 2013

(51) Int. Cl.
*G06F 1/16* (2006.01)
*H05K 10/00* (2006.01)

(52) U.S. Cl.
USPC ............ 361/679.09; 361/679.01; 361/679.02; 361/679.3; 361/679.55

(58) Field of Classification Search
USPC ............................ 361/679.09, 679.26, 679.27
See application file for complete search history.

(56) References Cited

U.S. PATENT DOCUMENTS

| | | | | |
|---|---|---|---|---|
| 5,576,929 | A * | 11/1996 | Uchiyama et al. | 361/679.58 |
| 5,646,872 | A * | 7/1997 | Yonenaga et al. | 708/173 |
| 5,743,606 | A * | 4/1998 | Scholder | 312/223.2 |
| 6,715,850 | B1 * | 4/2004 | Diaz et al. | 312/223.2 |
| 6,771,492 | B2 | 8/2004 | DeLuga et al. | |
| 7,035,095 | B2 | 4/2006 | Frame et al. | |
| 7,055,160 | B1 | 5/2006 | Tan et al. | |
| 7,755,882 | B2 * | 7/2010 | Guo | 361/679.09 |
| 8,341,832 | B2 * | 1/2013 | Theobald et al. | 29/825 |
| 2005/0105261 | A1 | 5/2005 | Bhogal | 361/683 |
| 2007/0019374 | A1 * | 1/2007 | Springer et al. | 361/685 |
| 2012/0052355 | A1 * | 3/2012 | Chiang et al. | 429/96 |

FOREIGN PATENT DOCUMENTS

JP 2009-080801 * 4/2009 ............ G06F 1/16

* cited by examiner

*Primary Examiner* — Tuan T Dinh
*Assistant Examiner* — Mukund G Patel (57) ABSTRACT

Laptops are described herein. The laptops include a display body and a keyboard body. The laptops further include a hinged cover. The hinged cover can be in a closed position for preventing access and/or protecting electronic components. Further, methods of protecting electronic components of a laptop are also described herein.

17 Claims, 6 Drawing Sheets

LAPTOPS AND METHODS OF PROTECTING ELECTRONIC COMPONENTS OF A LAPTOP

BACKGROUND

A laptop is a personal computer designed for mobile use. At least some laptops are provided with serviceable modular electronic components, such as a Central Processing Unit (CPU), RAM memory or expansion cards as well as other fixedly attached electronic components as a motherboard or controllers mounted on the motherboard.

It is generally desirable to provide an easy access to serviceable components. At least some laptops provide an aperture at its bottom through which some or all of these components can be accessed. A removably mounted panel may be provided for closing and opening the aperture. However, removing the panel may be cumbersome. For example, the panels may require being completely detached from the laptop for accessing the modular components. Further, the panels may only be removed using tools, such as a screwdriver, thereby causing inconvenience to the user.

BRIEF DESCRIPTION OF THE DRAWINGS

The Figures depict examples, implementations, and configurations of the invention, and not the invention itself.

DETAILED DESCRIPTION

In the foregoing description, numerous details are set forth to provide an understanding of the examples disclosed herein. However, it will be understood by those skilled in the art that the examples may be practiced without these details. Further, in the following detailed description, reference is made to the accompanying figures, in which various examples are shown by way of illustration. In this regard, directional terminology, such as "top," "bottom," "front," "back," "left," "right," etc., is used with reference to the orientation of the figures being described. Because disclosed components can be positioned in a number of different orientations, the directional terminology is used for purposes of illustration and is in no way limiting. Like numerals are used for like and corresponding parts of the various figures.

While a limited number of examples have been disclosed, those skilled in the art will appreciate numerous modifications and variations therefrom. It is intended that the appended claims cover such modifications and variations as fall within the true spirit and scope of the examples.

Figure 1A:
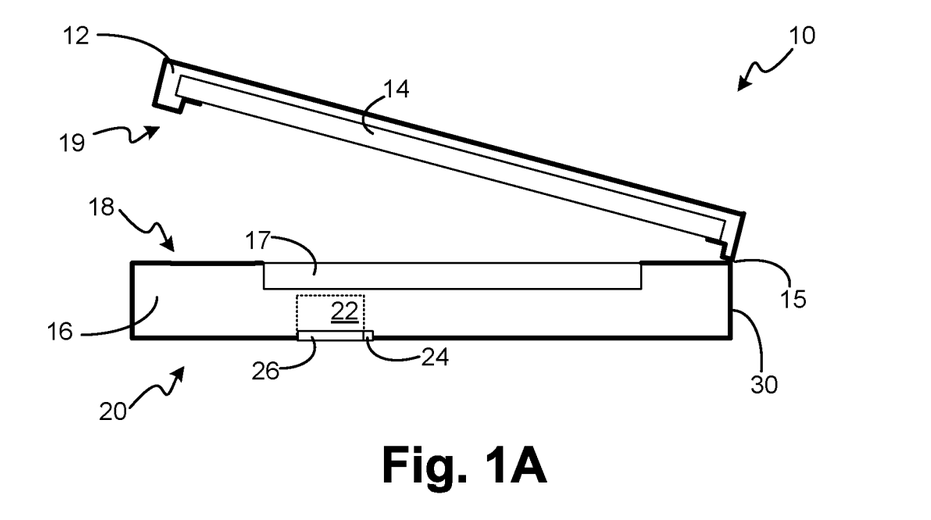
FIGS. 1A and 1B are side views of a laptop according to an example.
Figure 1B:
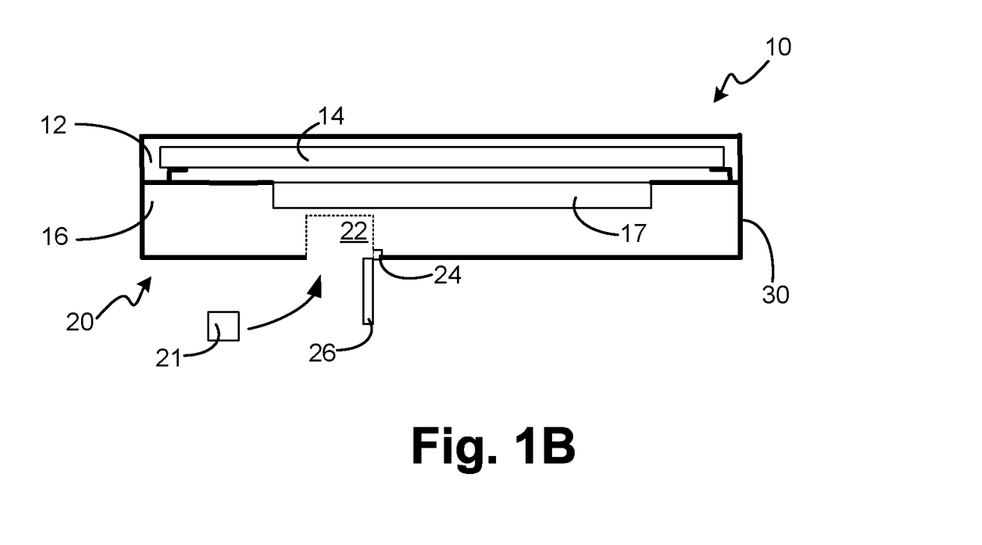

FIGS. 1A and 1B are schematic side views of a laptop 10 according to an example herein. Laptop 10 includes a display body 12 and a keyboard body 16. Display body 12 includes a display 14, e.g. a TFT display. Keyboard body 16 includes a keyboard 17 having a plurality of keys (not shown) for providing user control of laptop 10. Display body 12 is coupled to keyboard body 16 such that laptop 10 is foldable to a closed position (shown in FIG. 1B). For example, display body 12 may be hinged along an edge 15, so that display body 12 can rotate between an open position and a closed position. In the closed position of laptop 10, a keyboard side 18 of keyboard body 16 is adjacent to a display side 19 of display body 12.

Keyboard body 16 further includes an inner region 22 configured to receive an electronic component, such as a modular electronic component 21 or a fixedly attached electronic component. For example, electronic component 21 may be a component configured to be interchanged, substituted or upgraded. Keyboard body 16 further includes a hinged cover 26. As used herein, a hinged cover refers to a cover attached by a hinge to any portion of laptop 10. A hinge refers to a jointed device or flexible piece on which the cover is attached so that it can rotate between an open position and a closed position. In the example illustrated in FIGS. 1A and 1B, cover 26 is hinged to a portion 24 of keyboard body 16. Portion 24 may be a portion of a housing 30 covering components of keyboard body 16. Other examples herein illustrate a cover hinged to other elements of a laptop such as a chassis.

Hinged cover 26 is rotatable between i) an open position for facilitating access to inner region 22 from a bottom side 20 of laptop 10, and ii) a closed position for preventing access to inner region 22. FIG. 1A illustrates the closed position of hinged cover 26. FIG. 1B illustrates the open position of hinged cover 26. It will be understood that bottom side 20 of laptop 10 is the side corresponding to the base of laptop 10. As used herein, the base of a laptop is that part of the laptop on which the laptop stands when being in use on a flat surface (e.g., a desktop).

A hinged configuration of cover 26 facilitates easy access to inner region 22 by merely rotating cover 26 to its open position. In contrast thereto, a conventional cover may require complete removal of the cover in order to access inner region 22 from the bottom side of the laptop, which may be inconvenient for a user. Further, a removed cover is prone to become lost.

Figure 2A:
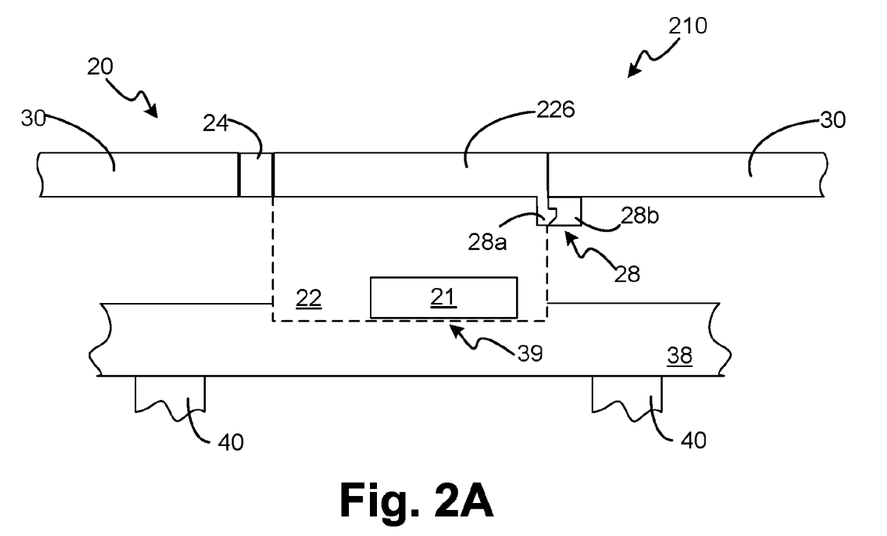
FIGS. 2A and 2B are cross-sectional views of a portion of a laptop according to an example.
Figure 2B:
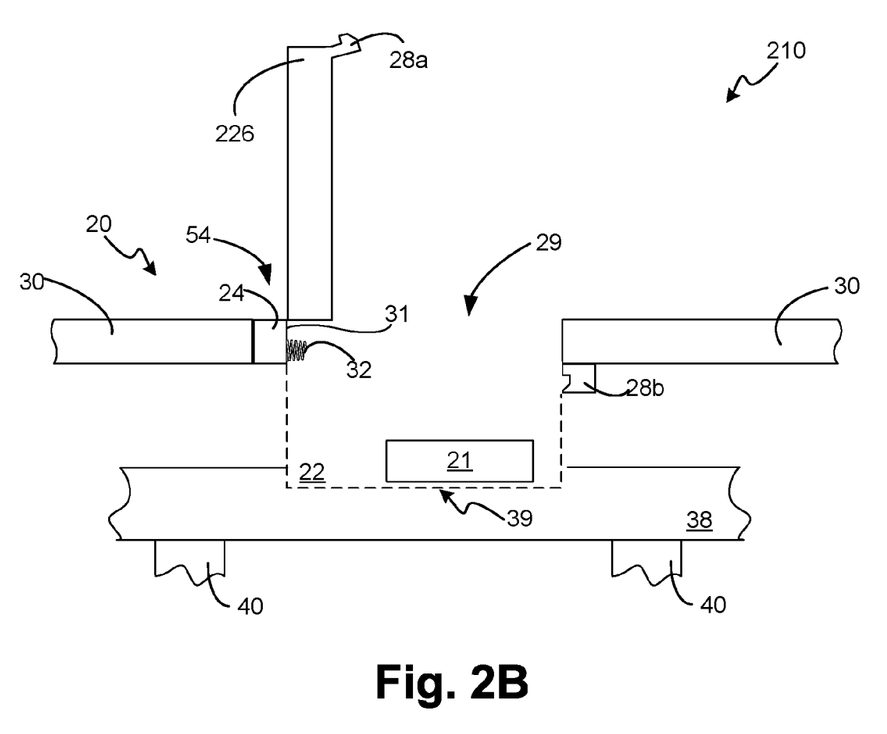

In examples herein, and as illustrated by FIGS. 2A and 2B, a cover as described may be such that it is releasable from its closed position by tool-less actuation. Tool-less actuation of cover 26 for opening facilitates a user-friendly access to electronic components from the bottom side of the laptop. FIGS. 2A and 2B are cross-sectional views of a portion of a laptop 210 according to an example herein. FIG. 2A shows a hinged cover 226 closed for preventing access to inner region 22. FIG. 2B shows hinged cover 226 open for facilitating access to inner region 22 from bottom side 20 through an aperture 29. In the illustrated examples, a portion 39 of motherboard 38 is disposed at inner region 22. Motherboard 38 is fixed to laptop 210 via a chassis 40. A serviceable electronic component 21 is attached to motherboard 38 at portion 39. Electronic component 21 can be accessed when hinged cover 226 is open.

In the example of FIGS. 2A and 2B, cover 226 can be released from the closed position by tool-less actuation through latch 28. More specifically, latch 28 may be for retaining cover 226 in a closed position. As used herein, a latch refers to any of various devices in which mating mechanical parts engage to fasten a cover as described herein to a portion of a laptop (e.g. housing 30). The latch illustrated by way of example in FIGS. 2A, 2B includes a lever 28a at cover 226 and a grip 28b at housing 30. Latch 28 can be released from a closed position by pushing cover 226 towards the interior of keyboard body 16. It will be understood that different types of latches are contemplated such as, but not limited to, any suitable compression, cam, or draw latch. A compression latch as used herein refers to a latch which is secured at its locking position by a compressed member (e.g., a compressed gasket). A cam latch as used herein refers to a latch which is secured at its locking position by a cam. A draw latch as used herein refers to a latch in which locking and unlocking is performed by, respectively, clipping and unclipping a handle.

In an example, latch 28 is such that it can be released by merely one touch actuation of a user. Latch 28 may be combined with a lock (as illustrated below with respect to FIG. 4A), so that cover 226 can be opened by firstly opening the lock and subsequently actuating latch 28. Alternatively, a cover as described herein may be maintained in the closed position by other means requiring tool actuation such as, for example, a screw or any other suitable fastening mean.

Laptop 210 may include a biasing member disposed to exert a force on the cover such that the cover rotates towards the open position when the cover is released from the closed position. The biasing member may be any element suitable for exerting a biasing force on the cover such as, but not limited to, a coiled spring or other structures that provide biasing characteristics similar to a spring including, for example, a torsion spring, a twin spring, or other constant force springs as well as flexible levers. In the example illustrated in FIG. 2B, laptop 210 includes a biasing member 32 for biasing hinged cover 226 in the closed position. In the illustrated example biasing member 32 is a spring. Biasing member 32 is illustrated disposed between the hinged edge 54 of cover 226 and an edge 31 of housing 30 at aperture 29, so as to provide a force therebetween. When cover 226 is released from the closed position by actuation of latch 28, biasing member 32 generates a force that facilitates rotation of cover 226 about its hinged edge towards an open position.

It will be understood that the illustrated placement and configuration of biasing member 32 is only illustrative and non-limiting. Biasing member 32 may be placed and configured in any manner such that a suitable biasing force is provided to cover 26 for facilitating rotation towards the open position when released. For example, biasing member 32 may be disposed for providing a biasing force between elements of latch 28. Biasing member 32 is illustrated as a compression spring. It will be understood that, depending on its placement and configuration, biasing member 32 may be any suitable spring for biasing a herein described cover in the closed position such as a tension/extension string or a torsion spring.

A hinged cover combined with tool-less actuation and a biasing member, as described above, further facilitate user-friendly access to an electronic component from the bottom side of a laptop. The user may get access to the electronic component merely by turning around the laptop and by a one-touch actuation of the cover. The biasing force provided by the spring element may then automatically swing back the cover towards the open position.

According to some examples, the hinged cover may be configured such that all electronic components at the interior of a laptop configured to be accessed from the bottom side are accessible when the cover is at the open position, as illustrated in FIGS. 3A to 4B. An inner region may be arranged for receiving the electronic components of the laptop serviceable from the bottom side. Thereby, the hinged cover may be opened for easily accessing all components serviceable from the bottom side.

Figure 3A:
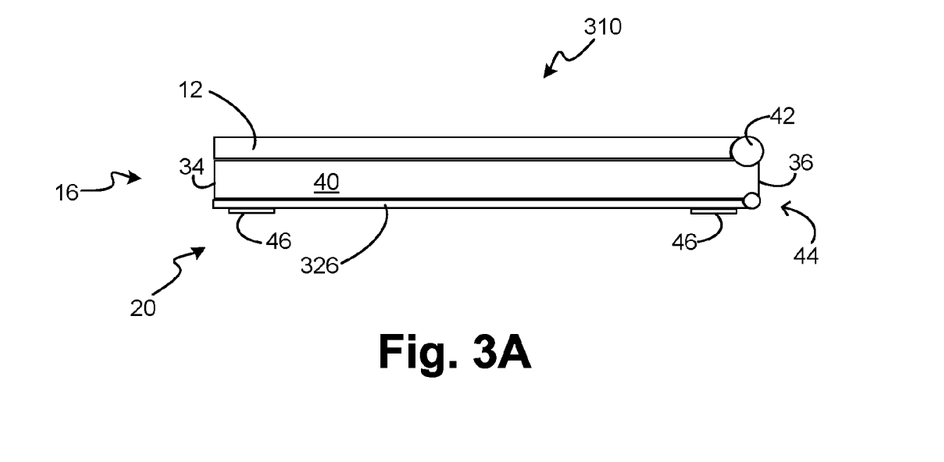
FIGS. 3A to 3D are different views of a laptop according to an example.
Figure 3B:
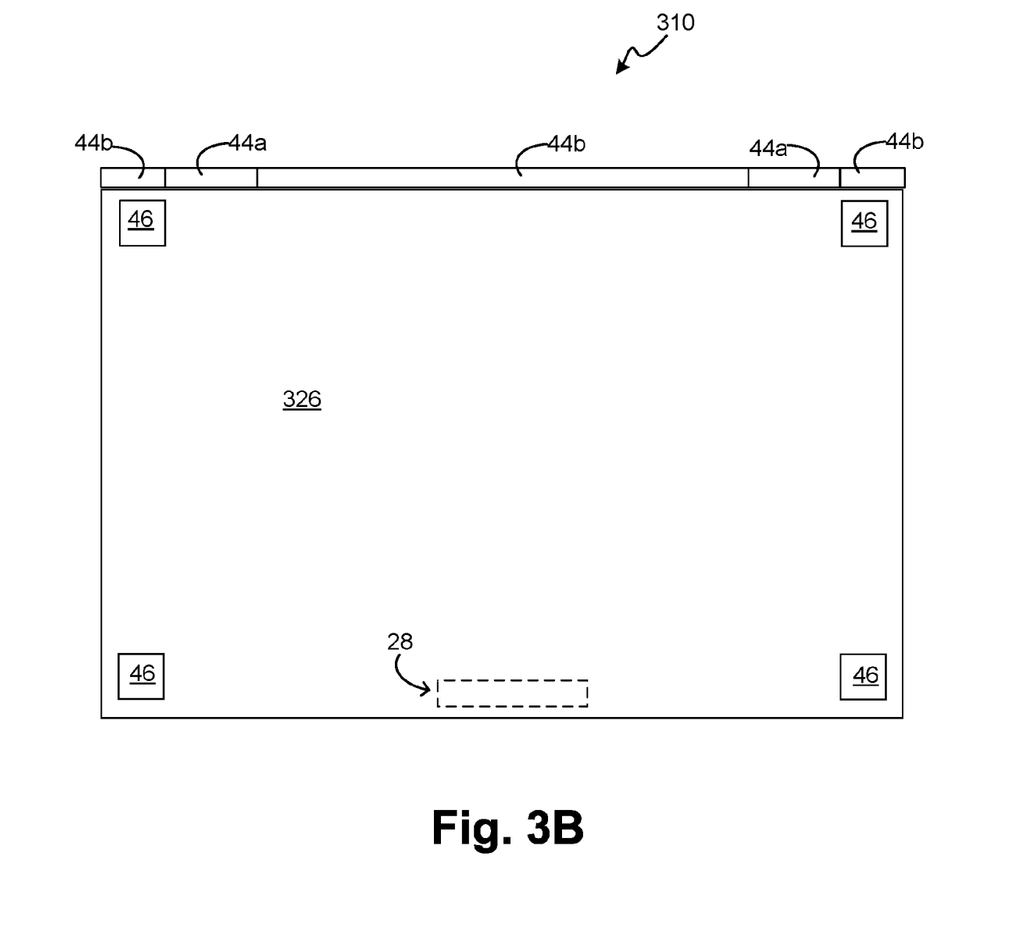

FIG. 3A shows a schematic side view of a laptop 310 according to some examples herein. FIG. 3B shows a schematic side view of laptop 310. Both Figures show a cover 326 in a closed position so as to protect electronic components of laptop 310 otherwise accessible from bottom side 20. Cover 326 is hinged at an edge 36 of laptop 310 via a hinge 44. Thereby, hinged cover 326 may provide access to a higher area of keyboard body 16. Further, display body 12 is also hinged to edge 36 thereby facilitating a reduction of the total footprint of laptop 310. It is also contemplated that cover 326 is hinged at an edge 34 opposite to edge 36 or any other edge of laptop 310.

In the illustrated example, hinged cover 326 forms the base of laptop 310. That is, hinged cover 326 may be configured to support laptop 310 when in use. Supporting pads 46 may be attached to cover 26 for supporting the weight of laptop 310 when in use. A hinged cover arranged as base of a laptop simplifies design and assembly by combining multiple functions in the same element as well as providing a convenient mean for providing access to all electronic components accessible from the bottom side of the laptop. Further, as illustrated with respect to FIG. 4A, a cover as described herein may partially support a laptop when in use.

In the illustrated example, cover 326 is hinged to chassis 40 of laptop 310. As described in other examples herein, cover 326 may be hinged to other elements of a laptop such as housing 30 of keyboard body 16. Hinge 44 may be configured such that it stiffens chassis 40. For example, hinge 44 may include elongated hinge members 44a, 44b along edge 36 such that they positively contribute to the total stiffness of chassis 40. Thereby, hinged cover 26 may improve robustness of laptop 310.

Figure 3C:
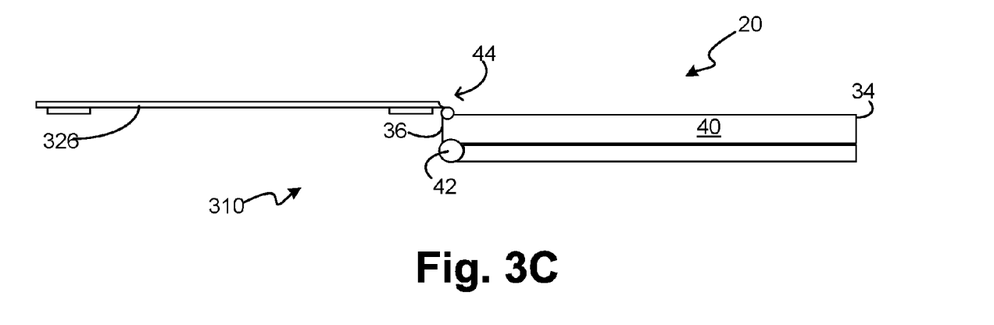
Figure 3D:
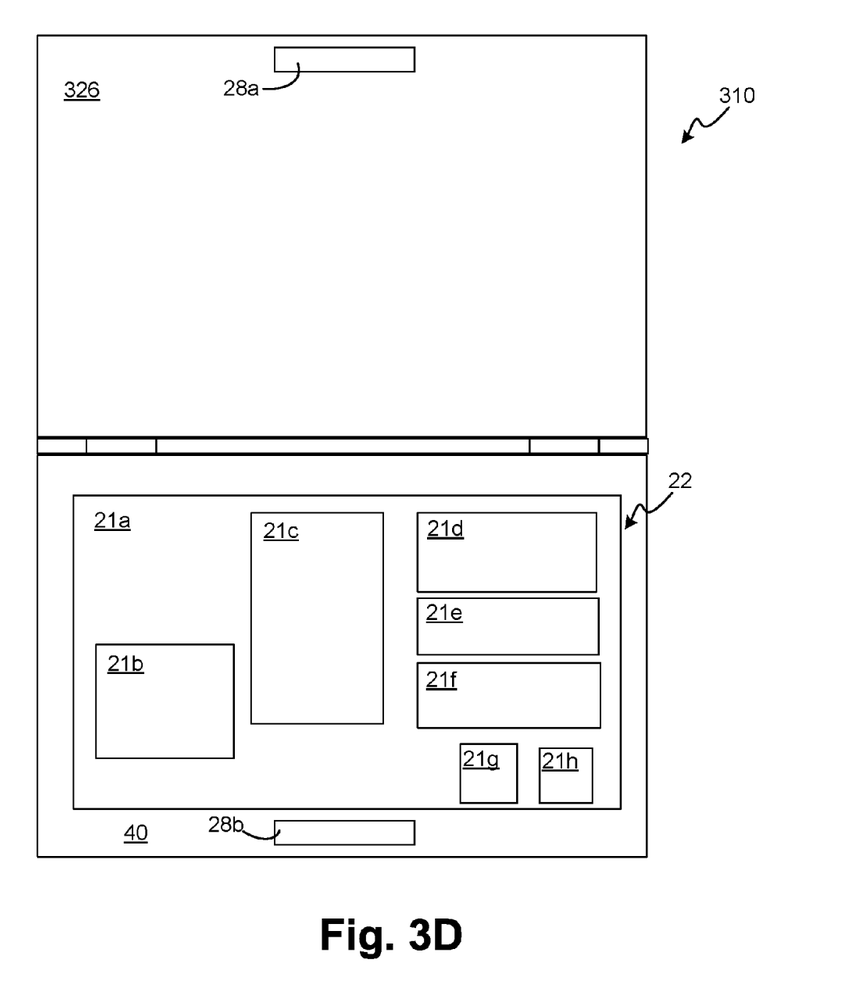

FIG. 3C shows a schematic side view of a laptop 310 according to some examples herein. FIG. 3D shows a schematic side view of laptop 310. Both Figures show cover 326 in an open position so as to facilitate access to the electronic components serviceable from bottom side 20. As shown in FIG. 3D, inner region 22 may receive the electronic components of laptop 310 serviceable from bottom side 20. In the illustrated example, these electronic components are a motherboard 21a supporting a central processing unit 21b, video controller 21c, RAM memories 21g, 21h, and expansion cards 21d, 21e, 21f. It will be understood that a laptop as described herein may include other components to be accessed from its bottom side. When hinged cover 326 is open, access is easily provided to all these components. Furthermore, cover 326 remains attached to laptop 326, so that the user does not have to dispose cover 326 for accessing the electronic components.

A mechanism 28 may be provided for releasably engaging cover 326 when the cover is at the closed position. In the illustrated example, mechanism 28 is releasable by tool-less actuation. Mechanism 28 may be a latch as described above including a latch member 28a at cover 326 and a latch member 28b at portion of laptop 310 fixed relatively to cover 326 such as, but not limited to, chassis 40 (as depicted in the present example) or housing 30 of keyboard body 16. Tool-less actuation for opening hinged cover 326 facilitates an easy access to the electronic components accessible from bottom side 20.

Further, laptop 310 may include a spring element (not shown in these Figures) as described above, so that cover 326 may rotate towards the open position when released from the closed position. Such a full-access hinged cover, which is tool-less actuatable for opening, and that rotates towards the open position when released from the open position is a convenient system for facilitating servicing of components in a laptop.

A laptop as described herein may include a lock for preventing unintentional release of the cover as described herein from the open position. The lock may be any locking device suitable for securing a cover as described herein at a closed position with a mechanism for preventing unintentional release of the cover. For example, a lock may include a slidable bar biased to a locking position. For releasing the cover, the user may slide the bar to a releasing position and hold the bar for releasing the cover from its closed position. A lock may be combined with latch 28 so as to lock the cover at the closed position. For releasing the cover from the closed position, the user may first release the lock and, then, actuate latch 28. Such a lock may be provided at any suitable portion of a laptop such as chassis 40. The lock may be hand- or tool-actuated.

Figure 4A:
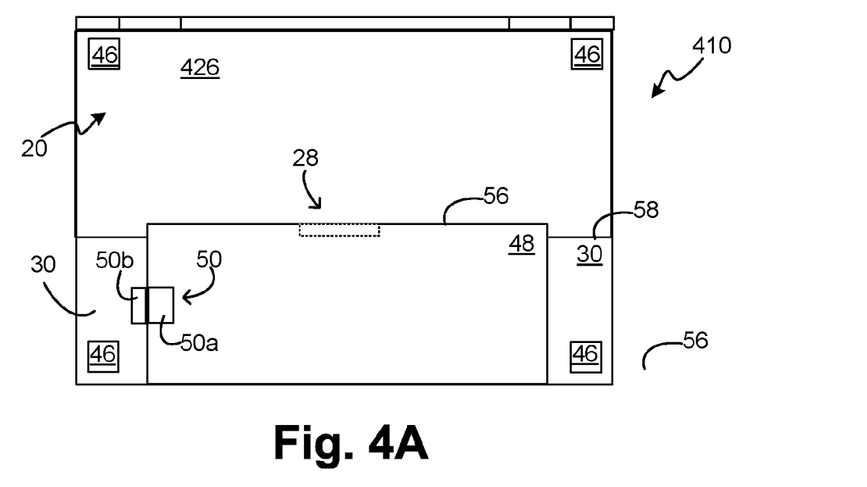
FIGS. 4A and 4B are different views of a laptop according to an example.
Figure 4B:
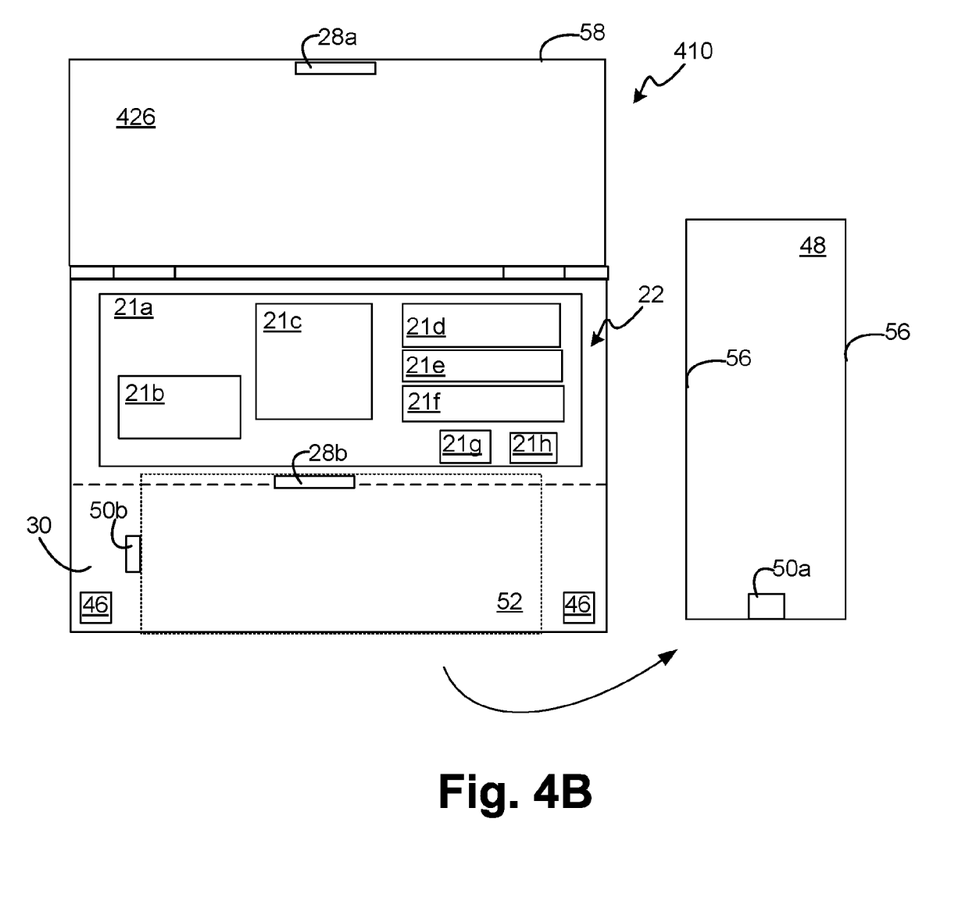

FIGS. 4A and 4B show a particular example of a laptop with a lock. More specifically, the Figures show a battery 48 acting as a lock for a cover 426. FIG. 4A shows a schematic front view from the bottom side of a laptop 410 with cover 426 in the closed position. FIG. 4B shows a schematic side view from the bottom side of laptop 410 with cover 426 in the open position. Laptop 410 includes a battery 48. As shown in FIG. 4A, battery 48 may be placed at a battery slot 52 for powering laptop 410. In the illustrated example, cover 426 is releasably engaged by a latch 28 similar as those described above. Battery 48 may be engaged to the body of laptop 410 by a fixing mechanism 50. Mechanism 50 may include a locking member 50a on battery 48 that can be engaged to a mating member 50b at housing 30 for fixing battery 48 in battery slot 52.

Battery 48 may be placed in battery slot 52 so as to retain cover 426 in its closed position. For example, when cover 426 is in the closed position, battery 48 may be placed into battery slot 52, a top edge 56 of battery 48 overlapping a bottom edge 58 of cover 426, so as to block cover 426 at its closed position. For accessing electronic components of laptop 410 from bottom side 20, firstly, battery 48 is released from battery slot 52 by actuating fixing mechanism 50; secondly, cover 426 may be released from its closed position by actuation of latch 28; lastly, cover 426 may be rotated via hinge 44 to the open position shown in FIG. 4B. As set forth above, a biasing member (not shown in the present figure) may be provided for actively rotating cover 426 towards its opening position when latch 28 is released.

Figure 5:
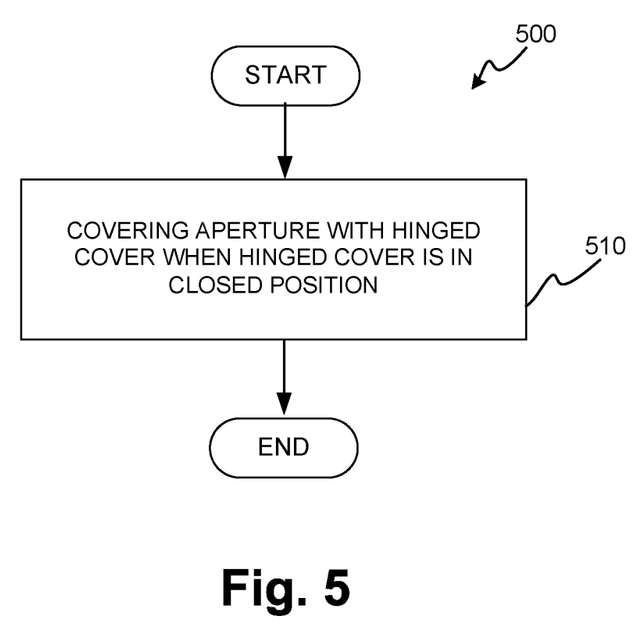
FIG. 5 is a flowchart of a method of protecting electronic components of a laptop according to an example.

FIG. 5 is a flowchart 500 of a method of protecting electronic components of a laptop according to examples. Components of the laptop referred to in flowchart 500 are illustrated above with respect to FIGS. 1A to 4B. Flowchart 500 may be performed at a laptop as described above (e.g. any of laptops 10, 210, 310, 410) including a) a chassis 40 for supporting elements of the laptop, b) a keyboard body 16 including a housing 30 with an aperture 29 through which the electronic components at the bottom side of keyboard body 16 are accessible, and c) a hinged cover (e.g., any of covers 26, 226, 326, 426). The cover may be hinged to chassis 40.

At a step 510, the cover is placed in a closed position in front of aperture 29 so as to prevent access to the electronic components. For example, flowchart 500 may be performed with a cover constituting the base of the laptop. Further, the cover may be placed in a closed position by actuation of a latch. Further, the cover may be placed in a closed position where a biasing member exerts a biasing force such that, when the cover is released from the closed position, it rotates towards an open position as described above.

In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the disclosed examples.

What is claimed is:

1. A laptop, comprising:
   a display body including a display;
   a keyboard body including
   a) a keyboard side;
   b) a bottom side;
   c) an inner region to receive a plurality of electronic components, wherein the plurality of electronic components comprises at least a central processing unit (CPU) and a RAM memory;
   d) a hinged cover rotatable between
   i) an open position that facilitates access to the CPU and the RAM memory within the inner region from the bottom side; and
   ii) a closed position that prevents access to the CPU and the RAM memory within the inner region; and
   e) a battery slot on the bottom side to receive a battery, wherein a portion of the hinged cover is between the bottom side of the keyboard body and an edge of the battery when the battery is installed within the battery slot to prevent the cover from rotating from the closed position to the open position.

2. The laptop of claim 1, wherein the cover is configured to be released from the closed position by tool-less actuation.

3. The laptop of claim 2, wherein the cover is retainable in the closed position by a latch.

4. The laptop of claim 2, further including a biasing member arranged to exert a force on the cover such that the cover rotates towards the open position when the cover is released from the closed position.

5. The laptop of claim 1, wherein each of the plurality of electronic components of the laptop that are configured to be accessed from the bottom side of the laptop are accessible when the cover is at the open position.

6. The laptop of claim 1, wherein the cover constitutes a portion of the base of the laptop.

7. The laptop of claim 1, wherein the cover is hinged at an edge of the laptop.

8. The laptop of claim 7, wherein the cover is hinged at an edge of the laptop where the display body is hinged.

9. The laptop of claim 1 further comprising a chassis, the cover being hinged to the chassis.

10. The laptop of claim 1 further comprising a housing and a latch configured to engage the cover to the housing when the cover is at the closed position.

11. The laptop of claim 2 further comprising a lock arranged to prevent an unintentional release of the cover from the open position.

12. The laptop of claim 1, wherein the plurality of electronic components also includes an expansion card.

13. A laptop, comprising:
   a chassis;
   a display body including a display;
   a keyboard body including
   a) a keyboard side and a bottom side,
   b) an inner region to receive the electronic components of the laptop serviceable from the bottom side,
   c) a cover hinged to the chassis so as to be rotatable between
   i) an open position to facilitate access to the electronic components of the laptop serviceable from the bottom side, and
   ii) a closed position to protect the electronic components of the laptop serviceable from the bottom side, and
   d) a battery slot to receive a battery, wherein a portion of the cover is between the bottom side of the keyboard body and an edge of the battery when the battery is installed within the battery slot to prevent the cover from rotating from the closed position to the open position.

14. The laptop of claim 13, further comprising a latch to releasably retain the cover in the closed position.

15. The laptop of claim 13, further including a biasing member configured to exert a force on the cover such that the cover rotates towards the open position when the cover is released from the closed position.

16. The laptop of claim 13, wherein the cover constitutes a portion of the base of the laptop.

17. A laptop, comprising:
- a display body including a display;
- a keyboard body including:
  - an upper side and a lower side opposite the upper side, wherein the upper side includes a keyboard and a majority of the lower side comprises a cover coupled to the keyboard body through a hinge along an edge of the keyboard body;
  - an inner region disposed between the upper side and the lower side; and
  - an electronic component disposed within the inner region;
  - wherein the cover is arranged to rotate about the hinge to provide access to the electronic component; and
- a battery slot on the lower side to receive a battery, wherein a portion of the cover is between the lower side of keyboard body and an edge of the battery when the battery is installed within the battery slot to prevent the cover from rotating about the hinge.

* * * * *